Jan. 12, 1971  J. D. WASER  3,553,950

RAKE TINE ASSEMBLY

Filed Aug. 8, 1968  2 Sheets-Sheet 1

INVENTOR
JAMES D. WASER
BY
Baldwin, Egan, Walling & Fetzer
ATTORNEYS

Jan. 12, 1971   J. D. WASER   3,553,950
RAKE TINE ASSEMBLY
Filed Aug. 8, 1968   2 Sheets-Sheet 2
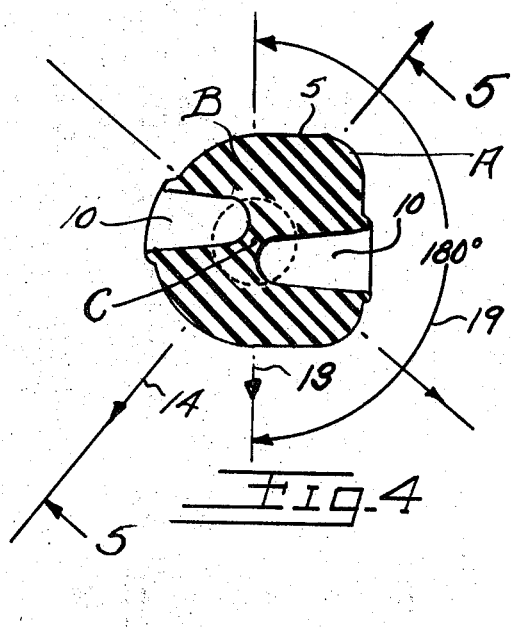
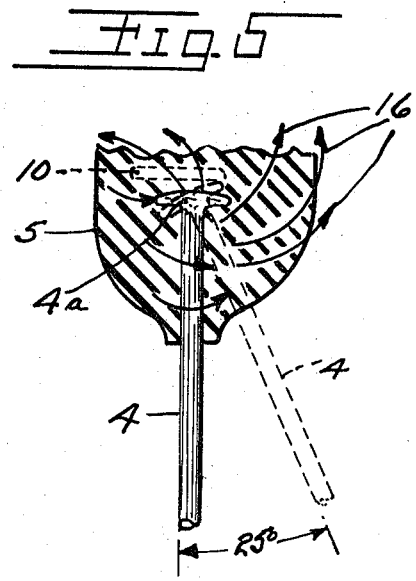
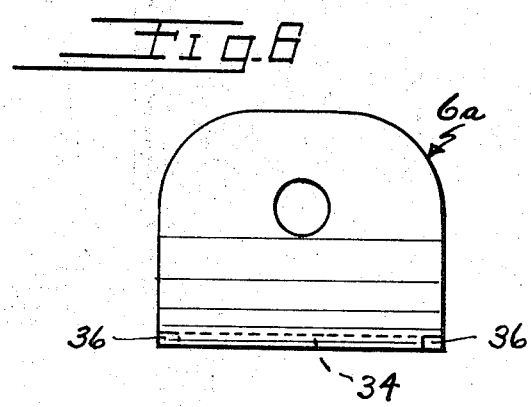
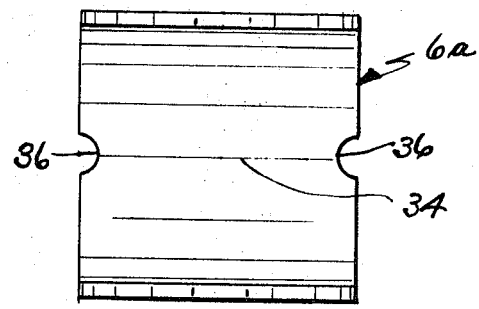
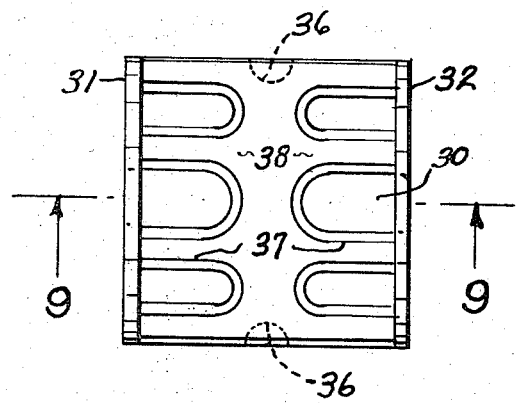
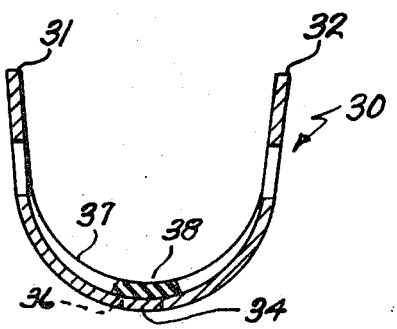
INVENTOR
JAMES D. WASER
Baldwin, Egan, Walling & Fetzer
ATTORNEYS

United States Patent Office 3,553,950
Patented Jan. 12, 1971

3,553,950
RAKE TINE ASSEMBLY
James D. Waser, Fort Wayne, Ind., assignor to Cooper Tire & Rubber Company, Findlay, Ohio, a corporation of Delaware
Filed Aug. 8, 1968, Ser. No. 751,195
Int. Cl. A01d 77/00, 7/06
U.S. Cl. 56—400     6 Claims

ABSTRACT OF THE DISCLOSURE

A rake tine mounted in a member formed of a resilient material such as an elastomeric rubber which is formed with voids extending into the interior and which permit displacement of the material into said voids upon stresses being applied to the rake tine.

---

This invention relates generally to improvements in crop engaging rake devices and more particularly to a new and novel rake tine assembly for use in an agricultural rake device.

As heretofore known, a conventional agricultural rake is a device designed to collect crops into what are sometimes referred to as windrows which are usually disposed alongside the path taken by the rake device. Such rake device normally includes a plurality of rake bars to each of which is affixed a plurality of depending rake tines usually formed of metal, and which, in one type of rake move generally parallel with, and immediately adjacent to, the ground surface in a direction that is tangential to the forward movement of the rake device or machine, said movement being accomplished so that the tine engages the crop and thus collects it into the aforementioned windrows. Another example of a conventional rake is known as a circular or wheel rake in which the rake bar is disposed at the perimeter of a rotating wheel or the like and which carries the rake tines into engagement with the crop.

Oftentimes, during crop raking by rake devices such as of the types above described, the rake bar and rake tines including the mounting means therefore are subjected to continuously repeated dynamic stresses or shocks which result from the dependent tines being deflected, impacted and/or twisted while engaging the crop, the ground and/or foreign objects thereon. The introduction of such stresses and shocks into a rigid rake tine, constructed entirely of metal, rigidly mounted, in turn, onto a rigid rake bar, results in said tine undergoing severe deteriorating fatigue and a resultant high incidence of breakage with consequent shortened service life of the rake bar assembly. In addition, when the rake is operated under unusual conditions, such as in areas of heavy concentrations of the crop and/or of foreign materials or variances in ground contour, etc., the deterioration and/or breakage of the rake tines is accelerated with a correspondingly additional reduction in the service life of the rake bar assembly. Also, the broken rake tines which become lost in the crop, impose a substantial hazard to equipment used later in processing the crop and in some instances pose a hazard to the animals to which the harvested crop is subsequently fed.

To date numerous designs of rake tine assemblies have been developed in an effort to overcome the above described deficiencies among others equally well known and which assemblies include constructions embodying rubber or other elastomeric materials into which the rake tine member is mounted.

As merely one example of such prior art mounting for rake tines, reference is made to U.S. Patent 3,065,591 in which an elastomeric material is utilized to secure the rigid tine to the rake bar of an agricultural rake. The elastomeric material is molded around the upper end of the rigid tine member and is adapted to provide for the attachment of the tine member to the rake bar of the rake device and further to be operative to absorb the stresses and shocks that are encountered as the tine member performs its raking function. Also, the elastomeric member is intended to resist deflection or displacement of the rigid tine member and to enable the tine member to return to its normal position with respect to its mounting means when said stresses and/or shocks are removed therefrom.

One of the disadvantages known to exist with the use of such present day mountings for rake tines is that the elastomeric material suffers substantial internal deterioration due to its being a solid mass and which is exposed to a concentration of stresses applied thereto in a relatively small portion thereof particularly that portion which is interposed between the rake bar, as for example, to which it is mounted and the rake tine and areas of said material contiguous thereto.

Additionally, with the elastomeric member being of solid construction when the rigid tine is deflected and subsequently abruptly released from the deflecting force such as when encountering an object in the path thereof and is then allowed to freely seek its original position, the spring characteristics of a solid, unrelieved elastomeric mass is unduly conducive to generating and transmitting resoanance to the tine member. Said resonance imposes an additionally extended dynamic internal condition to the elastomeric member to thereby greatly increase the rate of material fatigue and deterioration and hence reduction of the functional life of the rake tine assembly.

It is therefore an object of this invention to provide an improved rake tine assembly and mounting means therefor, which embodies a rubber or other elastomeric member for connecting the rake tine to its mounting means such as a rake bar utilized on conventional agricultural crop rakes, said elastomeric member being constructed with novel stress relieving voids constructed and positioned therein so as to provide relief, internal of the mass, from stresses and shocks that are developed as a result of the deflection, compression and impaction forces to which the rake tine is subjected during its raking function.

Another object of the present invention is to provide an improved rake tine assembly and mounting means which embodies a member formed of rubber or other elastomeric material for connecting the rigid tine to its rake mounting means as above described, and further wherein the profile of the stress relieving void(s) in said member are each in tangential relationship with the direction of major tine deflection thus permitting substantial displacement of the internal mass of the elastomeric material that is interposed between the rigid tine member and its mounting means and contiguous to such elastomeric material mass and thus increasing the tolerable angle to which the tine member can be repeatedly angularly deflected in relation to its mounting without exceeding the ultimate yield point of the elastomeric material and its consequent deterioration.

A still further object of this invention is to provide an improved rake tine assembly and mounting means therefor which embodies rubber or other elastomeric material for connecting the rigid tine to an agricultural rake or the like, the configuration of said elastomeric mounting member being generally of envelope profile which is asymmetrical to the longitudinal axis of the rigid tine member with a geometry that provides for distribution of the elastomeric mass in such manner as to assure its maximum flexibility while exhibiting maximum resistance of the tine assembly to deflection along a generally predetermined path or direction.

Additional advantages of the rake tine assembly of the present invention will be realized by one skilled in the art and upon reference to the following disclosure of several preferred embodiments thereof which are illustrated in the accompanying drawings and wherein:

FIG. 4 is a horizontal section taken along the line 4—4 of FIG. 2;

FIG. 5 is a fragmentary view of the rake tine assembly of FIG. 1 shown partly in section and with the tine member being illustrated in dotted lines in a typical deflected position; and FIGS. 6–9 illustrate a second embodiment of clip member utilized in the rake tine assembly for attaching the assembly to an agricultural rake.

Figure 1:
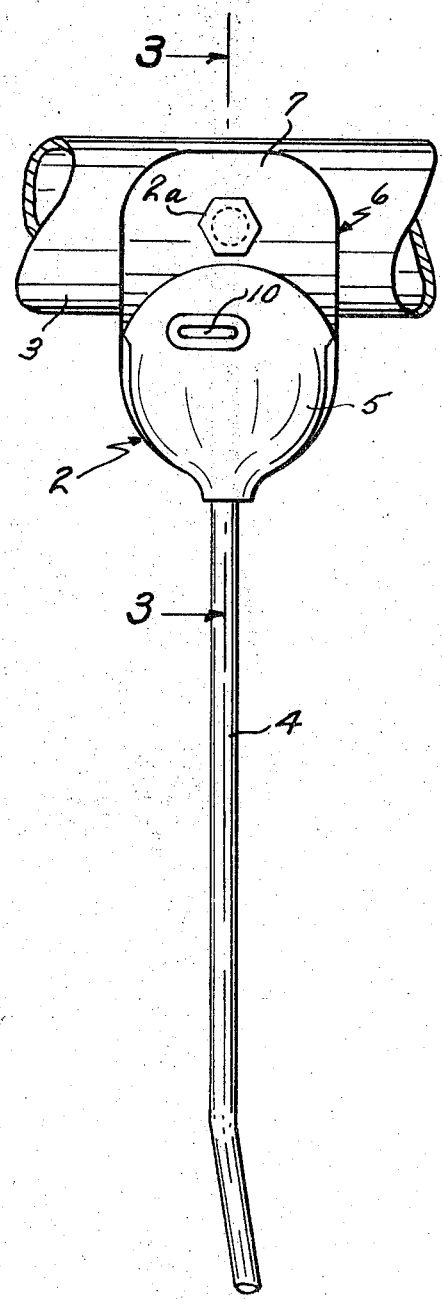
FIG. 1 is a side view in elevation of a rake tine assembly embodying the present invention and which is attached to a rake bar of a conventional agricultural rake.
Figure 2:
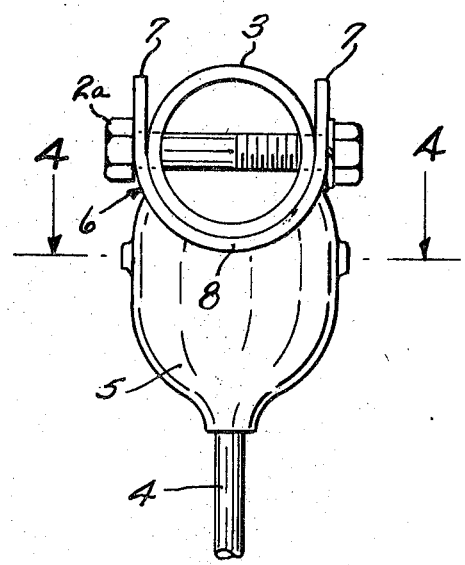
FIG. 2 is a fragmentary end view of the rake tine assembly shown in FIG. 1.

Referring now particularly to FIGS. 1 and 2 of the drawings the rake tine assembly of the present invention is identified in its entirety by the reference numeral 2 and is seen to be firmly attached by fastener 2a to a rake bar 3 of a conventional agricultural rake device.

As best seen in FIG. 2, the rake tine assembly includes a rigid tine 4 disposed at its upper end within a resilient bulb-shaped member 5 formed of rubber or suitable elastomeric material. A generally U-shaped steel saddle or clip 6 having two generally upwardly extending legs 7 spaced apart by an arcuate shaped bight 8 is firmly bonded on its underside to the resilient member 5. The aforesaid fastener 2a is seen to be inserted through mating orifices in the rake bar 3 and the clip 6, thus securing said rake tine assembly to the rake bar.

Figure 3:
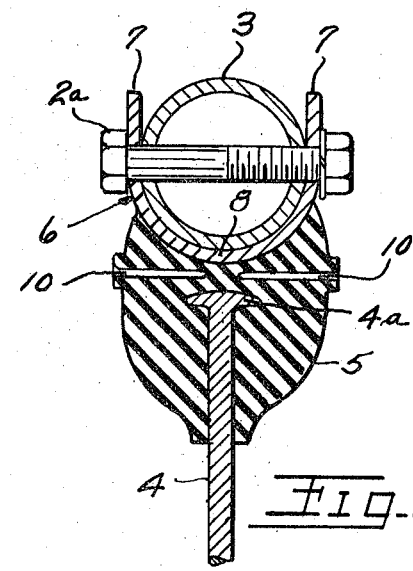
FIG. 3 is a vertical section taken along the line 3—3 of FIG. 1.

As best seen in FIGS. 1 and 3, the rake tine 4 is provided on its upper end with an enlarged head 4a. The tine is disposed centrally within the bulb-shaped member 5 and is firmly bonded to the same. Preferably, the bulb-shaped member is formed in a suitable mold into which the headed end of the tine is previously disposed whereby the shank and head surfaces of said tine are securely chemically bonded to the resilient member as best shown particularly in FIG. 3.

The resilient member 5 is formed with internal voids or cavities as indicated at 10, the instant embodiment showing two such voids and which, as seen in FIG. 3, extend into the body of said member as to be intermediate the bight 8 of the clip 6 and the top of the head 4a of the tine 4.

As best seen in FIG. 4, each void or cavity 10 is closed at its inner end and extends toward the longitudinal axis of the resilient body 5, being slightly spaced from each other as to be partially disposed on opposite sides of the center of said body.

The stress-relieving voids 10 are preferably of rectangular parallelepiped configuration being also positioned to extend into the internal mass of the elastomeric member 7 in preferred tangential relationship with the general direction of deflection of the rigid tine member 4 as would be anticipated for one of the commonly employed raking machines on which the rake bar 3 may be moved generally in one direction as indicated in FIG. 4 at 13, which is also generally tangential to and coincident with the direction of movement of the raking machine as indicated at 14.

The displacement of the elastomeric member 5 as a result of a given deflection of the tine member 4 is best seen in FIG. 5 wherein, in this instance, the deflection is approximately 25° from its normal non-stressed position and which is within the range of deflection commonly experienced for rake teeth of this type. Also illustrated in FIG. 5 is a representation 16 of the directions along which the deformative stresses or forces resulting from the angular deflection of the tine member 4 tend to develop, said stresses being concentrated into a relatively small portion of the internal mass of the generally bulb-shaped elastomeric member 5. The relief voids 10, when introduced into the mass of the member 5 as shown, enable the elastomeric material of said member to be displaced into said voids or cavities and disperse the stresses developed and substantially reduce the fatigue and deterioration of said elastomeric material and the chemical bond which secures said material to the contiguous surfaces of the rigid tine member 4 and clip 6. As a result, the effective service life of the tooth assembly is substantially extended over what has been heretofore experienced by permitting the retention of a substantially greater portion of the original physical properties of the elastomeric material over and through a substantially greater term of working or functioning time. The asymmetric configuration of the generally bulb-shaped, elastomeric member 5 as also shown in FIG. 5 also imposes resistance to deflection of the rigid tine 4 when said deflection is generally in the same direction as shown at 13 of the drawings, said member 5 being constructed to contain the major volume of its mass within an area as illustrated at A which extends generally radially around 180° arc 19, the radius of said arc being swung from approximately the center C of longitudinal axis of the rigid tine member. This major volume of said member is complemented by an opposite portion B as shown in FIG. 4 which is of lesser volume and constructed to impose less resistance than said major volume A to thus permit greater flexure of the elastomeric material in the area of said portion B. The aforesaid portion B is also contained within an area which extends radially around approximately an 180° arc which generally complements arc 19, said arc also being swung from the center C. The above described asymmetric construction improves the tooth function by increasing the resistance to deflection of the rigid tine member 4 while assuring a minimum of resonance in said tine member once deflected.

It will also be apparent that in addition to the stresses caused by angular deflection as described above, any displacements of the positional relationship between the tine member and the elastomeric member will induce internal stresses to the mass of said elastomeric member. By way of example, in a wheel rake type of rake device the weight of the wheel assembly is repetitively imposed in an impacting manner onto the exposed end of the tooth assembly coincident with the imposition of angular deflection to the rigid tine member. As is now apparent, the novel construction of the rake tine member embodied herein permits substantially greater compressive and/or deflective movement of the elastomeric material heretofore possible, thus dispersing a concentration of stresses and substantially reducing the deterioration of the elastomeric structure and increasing the functioning life term of the tooth assembly when applied to a working rake.

In FIGS. 6–9 is shown another embodiment of clip 30 to which the elastomeric member 5 is adapted to be bonded, and which is intended to provide for attaching the tine assembly to the rake bar of an agricultural rake or the like.

As best seen in FIG. 9, the clip 6a is generally U-shaped in elevation, and has arms 31, 32 spaced apart by an upwardly curved base or bight 34.

A groove or notch 36 is formed in the base 34 at each of its side edges. In the usual manufacture of the rake tine assembly, which includes the clip 6, 6a, tine 4 and elastomeric member 5, the clip and tine are disposed in their proper places in a mold into which elastomeric is poured, the cavity of the mold having the configuration of said member 5.

In this manner, the clip and tine are securely attached to the elastomeric member 5 to thus form a unitary tine assembly.

With the clip 6a as herein shown, the grooves 36 enable the elastomeric material to flow therethrough and over and upon the surface 37 of the clip to thereby coat said surface with a pad of said material as indicated at 38 whereby the clip is partially embedded in said elastomeric member.

Pad 38 as thus formed integrally with the elastomeric member 5 acts as a cushion when the tine assembly is mounted on a rake bar 3 or the like to thereby reduce accordingly the fatigue and wear imposed upon the fastening means such as bolts 2a.

Having thus described several preferred embodiments of rake tine assembly of the present invention, it is apparent to one skilled in the art to which it pertains that it is susceptible to modifications and various combinations without departing from the concepts of the invention which are defined in the claims.

What is claimed is:

1. A rake tine assembly for use on an agricultural rake comprising an elongated tine member formed of rigid material, a generally asymmetrically bulb-shaped member of elastomeric material, said tine member adjacent one end thereof being embedded in said bulb-shaped member and projecting outwardly from one end of said elastomeric member along the general direction of extension of the longitudinal axis of said elastomeric member when disposed in a normal non-stressed position, said elastomeric member having means for attaching said assembly to an agricultural rake, and said elastomeric member having a pair of voids formed therein closely adjacent to but spaced from said one end of said tine member and being disposed to enable the elastomeric material of said elastomeric member to be displaceable therein in response to the tine member being deflected from its non-stressed position, said voids extending inwardly into said elastomeric member from opposing asymmetric portions of said elastomeric member toward a plane containing said axis and terminating within the elastomeric member, said voids opening onto the exterior of said elastomeric member, each of said voids being elongated in the direction of said extension of the respective void, said voids being offset to opposite sides of said axis, and wherein each void extends inwardly into the elastomeric member along a common plane disposed generally perpendicular to the longitudinal axis of said elastomeric member, each of said voids being of a relatively small dimension in the direction of said longitudinal axes and thus having a relatively small height, the width of each void being smaller than the length of the respective void, each said void tapering inwardly commencing at the exterior of said elastomeric member and ending in a curved closed end closely spaced from the tine member, and each of said voids being intermediate said one end of said tine member and said means for attaching said assembly to the agricultural rake.

2. A rake tine assembly for use on an agricultural rake as defined in claim 1 and wherein the means for attaching said assembly to the rake includes clip means secured to the elastomeric member.

3. A rake tine assembly for use on an agricultural rake as defined in claim 2 and wherein the clip means is partially embedded in said elastomeric material.

4. A rake tine assembly for use on an agricultural rake as defined in claim 1 and wherein the elastomeric member is provided with a surface of concave configuration to enable said member to be securely attached to a rake bar of said rake having a complementary configuration.

5. A rake tine assembly for use on an agricultural rake comprising an elongated tine member formed of generally rigid material, a generally asymmetric bulb-shaped member of elastomeric material, said tine member adjacent one end thereof being embedded in said bulb-shaped member and extending outwardly therefrom along the generally longitudinal axis of said elastomeric member, said tine member projecting outwardly from one end of said elastomeric member and dispsed in a normal non-stressed position, said elastomeric member comprising a major mass portion extending approximately 180° in a plane transverse to said longitudinal axis and an opposing portion of a lesser mass volume extending for approximately the remaining, 180°, means secured to said elastomeric member for attaching said assembly to an agricultural rake, said elastomeric member having a pair of elongated voids formed therein opening onto the exterior of said elastomeric member and extending inwardly in a lengthwise direction from the exteriors of said opposing portions of said elastomeric member, said voids extending inwardly into said elastomeric member along a plane disposed generally perpendicular to said longitudinal axis of said elastomeric member, each of said voids having a widened mouth where it opens onto the exterior of the elastomeric member and tapering inwardly to terminate in a curved closed end, said ends of said voids being disposed in laterally spaced relation to said longitudinal axis of said elastomeric member and on opposite sides thereof, each of said voids being of relatively small height in the direction of said longitudinal axis and being of a length greater than the width of the respective void, said tine member being adapted to be deflected toward said major mass portion, said tine member having an enlarged head thereon embedded in said elastomeric member and with said head being disposed in close relation to said voids, said voids overlapping said head above the latter and being disposed intermediate said head and said attaching means.

6. A rake tine assembly in accordance with claim 5 wherein said length of each void is approximately twice said with of said mouth of the respective void.

References Cited

UNITED STATES PATENTS

| 3,065,591 | 11/1962 | Gustafson | 56—400 |
| 3,096,609 | 7/1963 | Garrett et al. | 56—400 |
| 3,151,436 | 10/1964 | Johnston | 56—400 |
| 3,253,394 | 5/1966 | Johnston et al. | 56—400 |

LOUIS G. MANCENE, Primary Examiner

J. N. ESKOVITZ, Assistant Examiner

U.S. Cl. X.R.

56—400.21